Jan. 19, 1960 W. O. BEYER 2,921,801
FLEXIBLE PIPE COUPLING
Filed March 21, 1955 2 Sheets-Sheet 1

INVENTOR.
WALTER O. BEYER
BY
Green, McCallister & Miller
his Attorneys.

Jan. 19, 1960 W. O. BEYER 2,921,801
FLEXIBLE PIPE COUPLING
Filed March 21, 1955 2 Sheets-Sheet 2

INVENTOR.
WALTER O. BEYER
BY
Green, McCallister & Miller
his Attorneys.

United States Patent Office 2,921,801
Patented Jan. 19, 1960

2,921,801

FLEXIBLE PIPE COUPLING

Walter O. Beyer, Pittsburgh, Pa.

Application March 21, 1955, Serial No. 495,433

2 Claims. (Cl. 285—5)

This invention relates to a highly adaptable construction for fluid-pressure-sensitive coupling devices suitable for crop irrigating systems and which may be used in connecting one fluid carrying member to another, may be used for closing off an end of a pipe or conduit member, and also may be used with an outlet or riser member to, for example, supply a spray head.

My invention deals particularly with a quick-release type of coupling which will provide a fluid seal with the members being connected, will securely hold the members in position when fluid pressure is applied, and will permit quick and easy disassembly of the members when and only when fluid pressure is released.

In a portable pipe line system for irrigating crops, a major problem has been to provide coupling parts which minimize the energy losses in the lines due to friction and leakage. The problem is complicated by other requisites which must be met by such a coupling. That is, the coupling should have a positive fool-proof holding action, work even when sludge, dirt and other foreign matter is present, be relatively light and inexpensive, and the various types of coupling members used (e.g., through units, dead-end units, etc.) should be interchangeable in its housing body to meet various field requirements. And, the coupling unit should be adaptable for use as an end closing unit, an intermediate connecting unit, as well as a spray or discharge head supply and support unit.

Some angular adjustability or flexibility of a pipe line system is essential because of the many different types of terrain upon which the system may be laid. In order to achieve system adaptability, the coupling unit should provide for some adjustability or flexibility in its assembled relationship when relatively rigid pipe or conduit members are to be used and should be capable of eliminating the adjustability or flexibility, at least as to certain members, when flexible or plastic pipe or conduit members are to be used, or the coupling unit is to constitute a dead-end.

Accordingly, it has been an object of my invention to meet the factors involved and provide a solution to the problem presented in the employment of the type of fluid couplings here involved;

Another object of my invention has been to devise a coupling unit or device which will provide a positive but easily releasable holding force and which will minimize fluid friction and leakage losses;

A further object of this invention has been to devise a coupling unit or device which provides a maximum of adaptability and versatility;

A still further object has been to devise an improved or more efficient fluid coupling construction of a quick releasable type.

The objects stated are merely illustrative and other objects will become more apparent from the following description and accompanying drawings, wherein:

Figure 1A is a fragmental side elevation in section of a through-flow type of coupling nose member that may be employed in place of one or both of the nose members shown in Figure 1;

Figure 1:
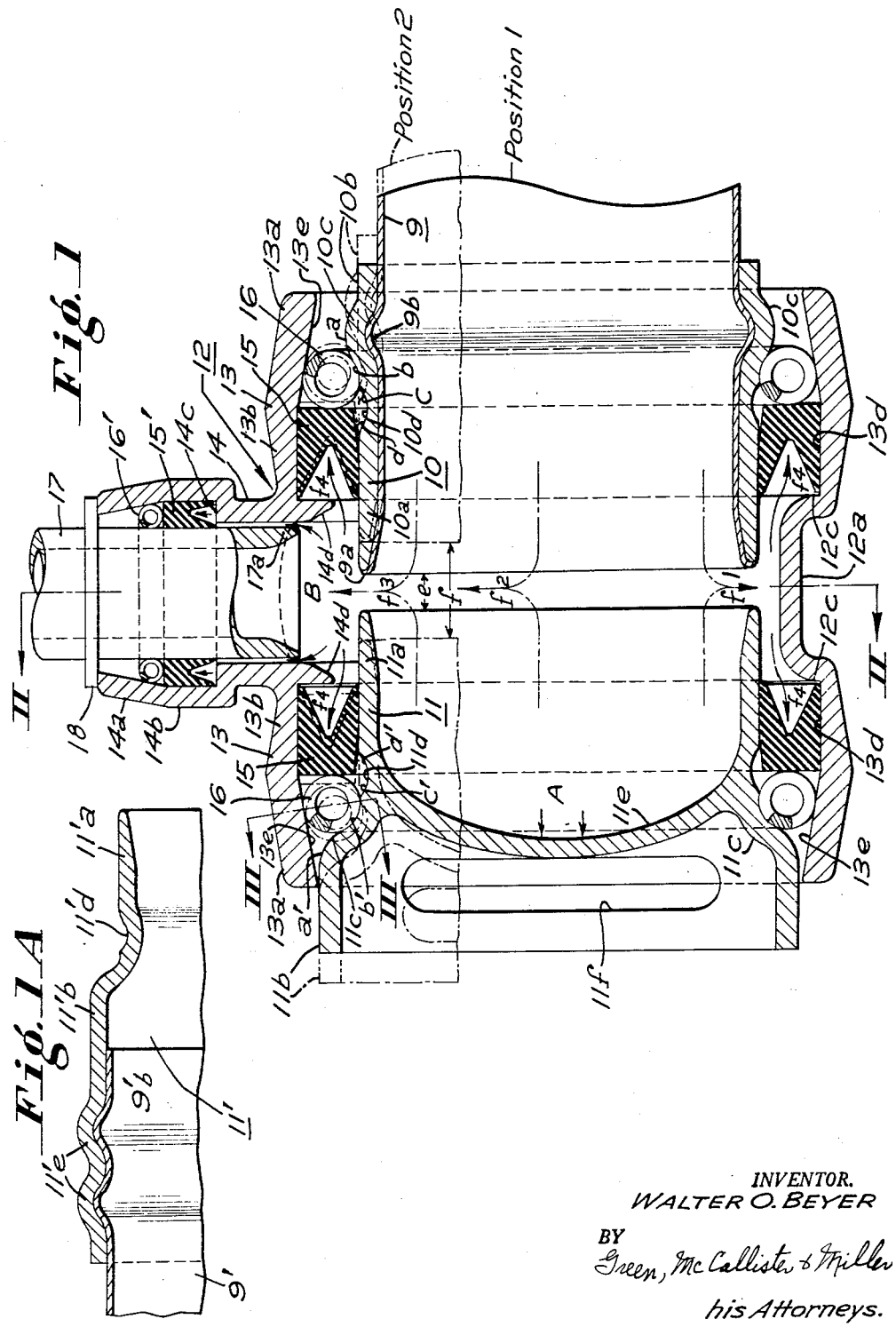
Figure 1 is a side elevation in section taken along the longitudinal axis of a coupling unit employing my invention, illustrating fluid flow therein and the relative positioning of the members before and after fluid pressure is applied; the coupling unit, as illustrated, is utilized for a dead-end and spray head take-off.

In carrying out my invention, I employ a coupling unit or device for a fluid flow system whose construction utilizes a main coupling housing body that is shown as providing a spray head, side take-off or throat, and a pair of opposite, longitudinally positioned, end throats to receive and hold coupling nose members or conduit end portions therein. The main housing body is generally tubular and is provided with opposite, longitudinal or axial, outer end portions which have radially-inwardly tapering, internal-cam-taper or outwardly-converging cone-shaped throat walls and inner annular or cylindrical walls which respectively form grip annulus and gasket receiving and operating portions or chambers.

The coupling housing body is also provided with a central, substantially annular, flow-shaping portion or chamber intermediate the end portions which chamber is defined by a generally tubular wall, the major portion of which has an annular or cylindrical configuration of reduced diameter. A gasket-retaining shoulder is located or formed between each gasket-receiving chamber and the flow chamber. An outlet opening is defined by the wall of the flow-shaping portion or chamber which wall slopes transversely-outwardly at substantially right angles to the longitudinal flow axis of the coupling (shown at its top side) into a nipple wall or coupling socket outlet end portion at a position which is substantially the same distance from the longitudinal axis of the housing body as the annular or cylindrical walls of the gasket and grip annulus retaining portions or chambers. As shown, the nipple wall 14 has an outer end portion (of reduced diameter, as compared to the longitudinal end portions) which has a forward cone-shaped throat wall 14a, an inner annular wall 14b, and a radially-inwardly projecting annular abutment or retaining shoulder 14c for a resilient gasket and grip annulus assembly.

Flow-shaping chamber B is further defined by a web on each side of the nipple wall. The webs extend between the outwardly-sloping wall (see Figure 2) and form extensions of the gasket-retaining shoulders, so that shoulders extend around the entire internal periphery of the coupling housing body. A resilient annular sealing gasket and a flexible grip annulus are positioned in each end or coupling sleeve portion of the coupling housing body in such a manner that fluid-pressure-sensitive chambers of the resilient annular gaskets are open towards the flow-shaping portion or chamber and are operatively positioned to cooperate with cone-shaped throat wall surfaces.

Of the pair of main coupling nose portions or members provided, at least one is connected to a pipe or conduit member of the flow system and the other may be a dead-end member or may also be connected to a pipe or conduit member of the system, depending upon the layout desired.

Each of the main coupling nose members is of a tubular construction and is provided with a cylindrical or annular front (inner) end wall portion and a cylindrical or annular back (outer) wall portion. The front or end wall portion has a smaller outer diameter than the internal diameter of the gasket-positioning shoulders in the coupling housing body, so that main nose members 10 and 11 may be inserted into the coupling housing body from its opposite longitudinal ends and into and to further define the flow-shaping portion or chamber B. In this manner, an annular fluid port or passageway is defined between the end walls or the opposed edges of the nose members. Thus, a fluid passageway is provided into the flow-shaping chamber that, as to its minimum width, is controlled by a cooperative engagement between grip annuluses and abutment shoulders when the main coupling nose members 10 and 11 are pushed or moved endwise into the housing body.

The sealing gaskets 15 and 15' and grip annuluses 16 and 16' in coupling housing body 12 operate to seal the spacing between the coupling nose members and the coupling housing body and to provide holding force upon the nose members. That is, each sealing gasket advances its adjacent cooperating grip annulus or coil forwardly-outwardly into an annular cavity or outwardly-converging, operating spacing between the coupling parts in response to fluid pressure in the system. The advancing action of the sealing gasket on the grip annulus and the cam action between the internally tapered cam or cone surface of the coupling housing body and nose member applies compressive force on the grip annulus to provide a holding force between coupling parts.

If the coupling nose member (pipe or conduit end portion) is to be used to provide a substantially rigid or non-pivotable joint, its outer or back wall portion, see 11b, is given an enlarged diameter such that it has a close-clearance, slide-fit, somewhat annular line-contact with outer ends of the coupling housing body. A tubular operating transition portion behind the slide fit on an outer wall portion of the coupling nose member and between such portion and an inner end wall is to be operatively engaged by a flexible grip annulus. The grip annulus provides a spaced-apart second annular-line contact for cooperating with the first-mentioned annular-line contact to provide a substantially non-pivotal relationship between coupling housing body 12 and conduit nose member 11.

The operating transition portion of both the nose members 10 and 11, as illustrated, is provided with an annular groove 10d adjacent the inner or end portion, an annular land or groove seat b immediately adjacent the annular groove, and a convexly-curved annular shoulder 10c extending between the land and the annular or cylindrical outer wall portion 10b. If a dead-end member 11 is desired, the above-described coupling nose member is provided with a closing wall 11e which is shown connected and located within the tubular transition portion and which closes off the member to fluid flow. In order to diffuse and deaden the shock of a sudden application of fluid pressure and to thus diminish the possibility of losing the dead-end member, the wall 11e is made concave. In this connection, it has been found that best results are obtained by giving the concavity of the closing wall the shape of a parabola.

Where a degree of adjustability or flexibility in the joint is desired, the cylindrical outer wall portion, see 10b, of the coupling nose member is given such a diameter that it has a large clearance in the end or nose portion of the coupling housing body 12 to provide for angular or pivotal adjustment therebetween and about the grip annulus. The tubular transition portion of the coupling member, as in coupling members 11 and 11', is provided with annular groove 10d immediately adjacent the inner wall portion, land portion or groove seat b immediately adjacent the annular groove portion, and curved shoulder 10c extending between the land and the cylindrical outer wall portion. However, in the case of a nose member 10 for a somewhat flexible joint, where its outer wall portion 10b may be no larger than its end portion 10a (as illustrated to the right of Figure 1), curved abutment shoulder 10c may be extended radially-outwardly between the outer wall portion and the transition portion.

The requisite or desired degree of rigidity of the joint is dependent upon whether or not a dead-end member 11 is used and upon whether or not one or both of the pipe members joined is flexible. That is, if the joint is to be used where flexibility or adjustability is not necessary, the rigid joint is preferred, since a better seal can be obtained and leakage loss minimized. In the case of a joint between a dead-end coupling member and the housing body, where the coupling nose member does not have to support an attached conduit member, a rigid joint contributes to a fool-proof holding action, as there is no weight of conduit backing up the nose member or to help absorb line surges, etc.

For example, in the dead-end coupling nose member 11, illustrated to the left of Figure 1, the close clearance fit of the outer wall portion of the dead-end member 11 within the coupling housing body 12, assures a proper initial alignment of the parts and prevents a cocking of the dead-end member under the application of fluid pressure. The curved and concave configuration given to the closing wall 11e in the dead-end member 11 also reduces the tendency of the part to cock under the application of fluid pressure. These factors assure a proper sealing action of the gasket, even at low pressures, and substantially eliminate the possibility of the dead-end member 11 shooting out under pressure. If the conduit or pipe 9 to be used in the system is flexible (such as of plastic material and not metal) then of course, both joints may be made rigid, whether one is a dead-end or not. If it is only necessary to have one joint which is adjustable, one of the joints may be made rigid and the other flexible by the selective use of coupling nose members of the type shown in Figures 1 and 1A.

With specific reference to the drawings, the coupling housing body is designated by the numeral 12 and the pair of main coupling members which are utilized with the coupling housing body in the embodiment illustrated in Figure 1 are designated by the numerals 10 and 11. The coupling housing body 12 and the coupling members (pipe or conduit end portions) 10 and 11 are preferably formed or cast from a light material such as aluminum and have rounded smooth edges to minimize friction losses.

As may be seen from the drawings, the main coupling housing body 12 is of generally tubular construction, is provided with opposite end walls 13 or coupling sleeve portions of like construction and a generally tubular intermediate or central connecting wall 12a. Each of the opposite end walls 13 includes an inwardly-tapered end wall portion 13a forming an internal cam-taper or outwardly-converging throat surface 13e. Back wall portions 13b have annular or cylindrical internal surfaces 13d. The tapered end wall portions 13a and the cylindrical wall portions 13b effectively form grip annulus and gasket-receiving, retaining or carrying chambers within the coupling housing body 12.

Figure 2:
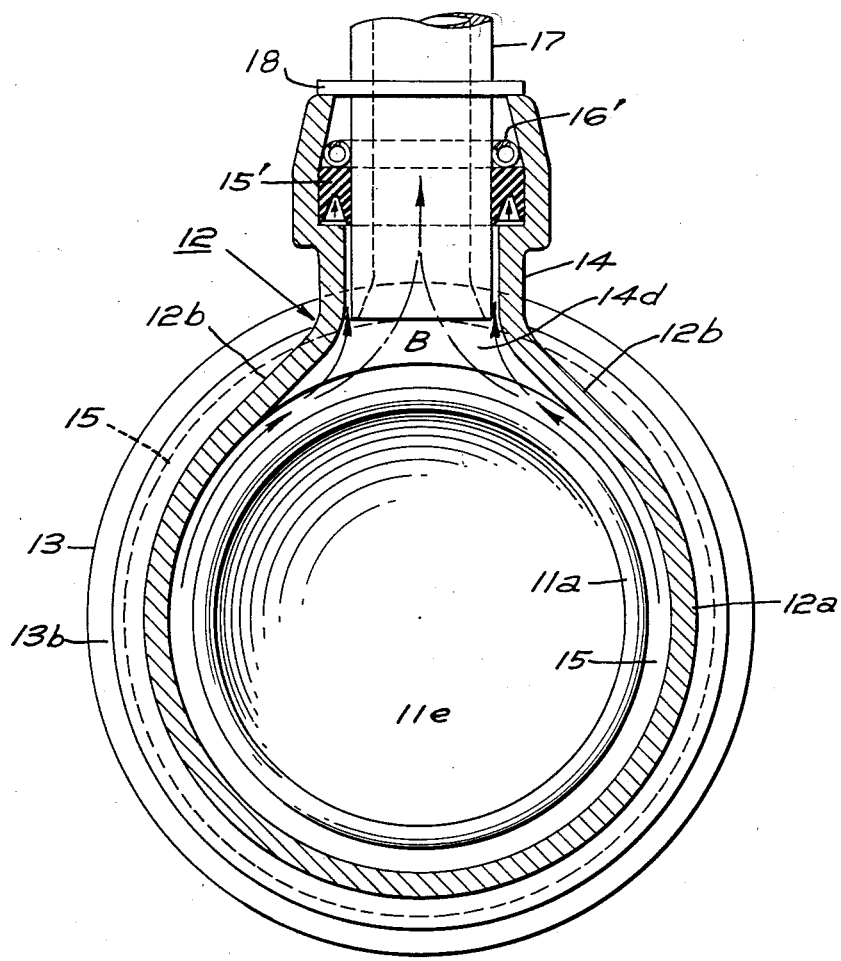
Figure 2 is an end section in elevation taken along the line II—II of Figure 1, illustrating the coupling unit and fluid flow therein.

The major portion of the generally tubular central wall 12a has a cylindrical configuration, the inner diameter of which is smaller than the inner diameter of the cylindrical walls 13b that provides the gasket-receiving chamber. As shown in Figure 2, the intermediate wall 12a has an outwardly sloped wall 12b to define a side outlet and receive a nipple wall, coupling socket body or part 14. The nipple 14 is shown located at the top side of the housing body 12 and as extending at substantially right angles to and at a distance from the longitudinal axis of the housing body that is substantially the same as the radius of the cylindrical wall portions 13b.

Since the diameter of the cylindrical portion of the intermediate or central wall 12a is less than the diameter of the cylindrical wall portions 13b of the end walls 13 of the coupling housing body 12, a pair of gasket-retaining wall portions or shoulders 12c (see Figure 1) are formed around the major portion of the internal periphery of the coupling housing body 12 between the wall portions 13b and the intermediate wall 12a. At the top outlet, opposed webs 14d extend between the outwardly-sloping portions 12b of the intermediate wall portion (see Figures 1 and 2) and adjacent opposite sides thereof, in such a manner that they form substantial continuations of the shoulders 12c. Thus, the intermediate wall 12a with its outward shoulder wall portions 12c, and the webs 14d define a side internal flow-shaping chamber B in the coupling housing body. The end walls 13 and gasket-retaining shoulders 12c and webs 14d define internal gasket and grip annulus-receiving end chambers. As will be explained in more detail later, the chamber within the intermediate wall 12a is given the name flow-shaping chamber, because it is shaped to direct the flow of fluid into the nipple 14 with a minimum of turbulence and resultant friction loss. It will be noted that it has a substantially annular shape and has a lesser radial depth or thickness than cross width.

A resilient annular sealing gasket 15 and a flexible grip annulus 16 are placed in each longitudinal end 13 of the coupling housing body 12 in such a manner that the gaskets 15 are intermediate the grip annuluses 16 and the grip annuluses 16 are positioned to cooperate within the tapered inner cam surfaces or throat portions 13e. Each annular sealing gasket 15 is preferably a unitary structure having a resilient solid annular base or heel portion and radially spaced-apart side walls or lips which protrude backwardly from the heel portion and define a V-shaped, fluid-pressure-sensitive receiving cavity or chamber therebetween. Each sealing gasket is positioned with its heel portion in operating adjacency or abutment against a flexible grip annulus and its fluid-receiving chamber is open towards the flow-shaping chamber B and to an immediate fluid-receiving chamber of low turbulence. The flexible grip annuluses 16 are preferably formed of spring-coiled metal or plastic.

The nipple part 14 is provided with a coupling body which has a radially-inwardly tapered forward end wall portion 14a and a cylindrical or annular back wall portion 14b which is connected to the central wall 12a and is in alignment with shoulders 12c and 14a. The diameter of the cylindrical wall portion 14b is greater than that of the connecting wall of the nipple 14 such that a gasket-retaining, annular shoulder 14c is provided.

It will be noted that the internal configuration of the nipple body or part 14 corresponds generally to the internal configuration of the end walls 13. A resilient annular sealing gasket 15' and a flexible grip annulus 16' are shown positioned within the nipple body. The nipple 14 is primarily provided for the efflux of fluid to a spray head riser pipe, take-off or conduit member 17, although it may be used in connection with another fluid line or may be closed off. As illustrated, the nipple 14, the sealing gasket 15' and the grip annulus 16' are provided for the purpose of positively coupling the inner or lower end portion or nose of the riser pipe or conduit member 17 of reduced diameter directly to the nipple body 14 and indirectly to the housing body 12 to flow fluid from the coupling body 12 into the pipe 17.

Of the pair of annular coupling nose members 10 and 11 shown in Figures 1 and 2, one (the member 10) is an open or flow member connected to a flow system and the other (the member 11) is shown as a dead-end member. However, the construction is adaptable in that the members 10 and 11 may be reversed as to their respective positions, and members 10 or members 11 may be employed at both end positions.

The member 10 is provided with a cylindrical inner or forward end wall portion 10a, a cylindrical outer or backward wall portion 10b, and an intermediate operating or transition wall portion. As illustrated, the cylindrical front wall and back wall portions 10a and 10b are given the same diameter which is small enough that the front wall portion of the annular nose member 10 may be freely inserted longitudinally-endwise through the normally slightly larger internal diameter of the flexible grip annulus 16 and into the internal diameter of the fluid flow chamber of the coupling end wall 13. The intermediate portion of the open end member 10 is defined by the annular groove portion 10d immediately adjacent the end wall portion 10a, land portion b adjacent and outwardly above the annular groove 10d, and curved abutment or push shoulder face portion a extending between the land b and the cylindrical back wall portion 10b. As shown with the coupling member 10, the convex face a of curved shoulder 10c is actually a convex raised annulus.

According to the preferred method of attaching the conduit or pipe member 9 to the coupling or nose member 10, the member 9 is forced endwise into the internal diameter of the member 10, the leading end 9a of the member 9 is wrapped outwardly over the front end of the member 10, and an intermediate portion 9b of the pipe member is forced up into the internal annular groove under the shoulder 10c of the coupling nose member. Thus, the pipe member 9 and coupling nose member 10 are held securely together and no sharp edges are presented to the fluid flow through the construction.

The coupling nose member 11, as illustrated, has a cylindrical forward or inner end wall portion 11a, a cylindrical back or outer wall portion 11b, and an intermediate operating transition wall portion. The end wall portion 11a is of the same outer diameter as the end wall portion 10a and thus, may be freely and easily inserted through the normally larger internal diameter of a grip annulus 16 and into the fluid flow chamber B of the coupling housing body.

The outer wall portion 11b of the dead-end coupling member 11 has a greater outer diameter than the wall portion 11a and such as to define a close clearance fit within the tapered throat wall 13a of the coupling housing body 12. Thus, the coupling member 11 will be inserted in the coupling housing body with a proper alignment. As a consequence, any coupling member having the general construction of the coupling member 11 will present a substantially rigid joint in the coupling housing body 12 and will have little or no angular adjustment.

The intermediate transition portion is provided with a forward annular groove portion 11d (corresponding to the groove portion 10d) adjacent the wall portion 11a, a land portion b' immediately adjacent and outwardly of the annular groove 11d, and a convexly curved shoulder portion 11c having its face a' extending between the land b' and the back wall portion 11b. The land b', as illustrated, has approximately the same diameter as the end wall portion 11a.

The dead-end coupling member 11 is also provided with an outer closing wall 11e which is shown as being located substantially within the transition wall portion 11c to close off the member to fluid flow. The closing wall 11e is inwardly concave in order to diffuse and deaden the shock of a sudden application of fluid pressure within the member, and also to centralize the effective force and prevent the dead-end member 11 from cocking or tilting within the coupling housing body 12 upon fluid pressure application. As shown, the concavity of the closing wall 11e has the shape of a parabola, since it has been found that this shape will give a maximum diffusion and shock deadening action. In addition, the outer wall portion 11b of the dead-end coupling member 11 is provided with an elongated aperture 11f on each side which permits the dead-end member to be easily manually grasped to aid in its manipulation.

The coupling nose members 10 and 11 are inserted into opposite ends 13 of the coupling housing body 12 before fluid pressure is applied and until they occupy operating positions, as indicated by the solid lines of Figure 1 (Position 1). That is, the coupling nose members are inserted into the opposite end walls 13 of the coupling housing body 12 until their cylindrical end wall portions 10a and 11a pass through the flexible gripping elements 16, through the gaskets 15, past the gasket positioning shoulders 12c (and shoulders or webs 14d), and into the flow-shaping chamber B of the coupling housing body 12 and until the abutment shoulder face portions $a$ and $a'$ engage the grip annuluses 16. The operating spaces or cavities between the coupling members 10 and 11 and the end walls 13 of the coupling housing body 12 contain the annular gaskets 15 and the grip annuluses 16. At this time, grip annuluses 16 are positioned on the lands $b$ and $b'$ and against the curved shoulders $a$ and $a'$ of the coupling members 10 and 11, respectively; and the gaskets 15 are in abutment or sealing engagement between the outer surfaces of the end wall portions 10a and 11a and the inner surfaces 13d of the cylindrical portions 13b of the coupling housing body 12.

When the nose coupling members are inserted, the shoulder faces $a$ and $a'$ engage the grip annuluses 16 and force the annuluses and the gaskets backwardly until the gaskets engage the gasket-retaining shoulders 12c and 14d. As will be seen from Figure 1, the coupling nose members 10 and 11 when fully inserted do not engage each other, but have an effective but restricted fluid flow passageway, port or space $e$ therebetween. The spacing $e$ provides an annular port from the interior of the nose coupling members into the flow-shaping chamber B of the coupling housing body 12.

When fluid pressure is applied to the system, it will of course fill the pipe 9 and apply pressure to the dead-end coupling member 11, the shock of which is diffused and diminished in the manner previously described. The fluid will escape from between the nose coupling members through the restricted annular port between edges of their end wall portions 10a and 11a and into the flow shaping chamber B of the coupling housing body 12, as is indicated by the flow lines $f_1$, $f_2$ and $f_3$. It will be noted that the passageway or port is of variable width, in that it widens from $e$ to $f$ (see Figure 1) when fluid pressure is applied. Of the fluid which flows out of the annular port, a part thereof will be moved into side chambers and into the cavities of the gaskets 15, as is indicated by the flow lines $f_4$. The pressure of the fluid in the coupling nose members 10 and 11 sets up forces that would normally tend to force them apart, away from each other or out of the coupling housing body 12 and the grip annuluses.

Fluid pressure $f_4$ which enters the cavities of the sealing gaskets 15 causes the gaskets and at least, their heel portions to move forwardly-outwardly. As a consequence, the grip annuluses 16 are advanced forwardly-outwardly along the inwardly tapered cam surfaces 13e and essentially, into gripping engagement with opposed operating surfaces in the direction of convergence of the operating spacing defined therebetween. As shown by dot and dash line Position 2, the nose members 10 and 11 move slightly outwardly and the annuluses 16 may ride off the lands $b$ and $b'$ and into latching engagement with the forwardly declining and backwardly positioned surfaces $d$ and $d'$ of the annular groove portions 10d and 11d. It will be noted that the lands $b$ and $b'$ and the groove portions 10d and 11d have a curvature substantially corresponding to that of the grip annuluses 16. As the grip annuluses 16 are advanced on the tapered inner cam surfaces 13e, their outer diameters are diminished and they are forced upwardly on the surfaces $d$ and $d'$ of the annular grooves 10d and 11d respectively.

Figure 3:
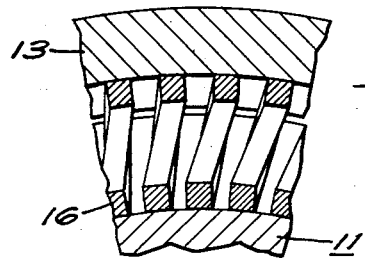
Figure 3 is an enlarged fragmental section taken along the line III—III of Figure 1, and illustrating a grip element or annulus and its operative positioning within the coupling unit.

The grip annuluses 16 thus close radially-inwardly as the coil moves outwardly along the tapered inner cam surfaces 13e and positively lock the coupling nose members 10 and 11 in position within the coupling housing body 12. If the annuluses 16 are formed of flexible coiled metal or plastic, as preferred, see Figure 3, the coils act as a set of multiple jaws closing on the coupling members. The condition just described is indicated by the dotted line position of the elements in Figure 1 which is labeled Position 2.

In Figure 1, $f_1$, $f_2$ and $f_3$ represent fluid flow from the coupling nose members into the flow shaping chamber B of the coupling housing body 12. Due to the shape of the flow shaping chamber B, the fluid entering is shaped to flow upwardly and outwardly between the webs 14d into the spray head riser or pipe 17, as may be seen from Figure 2. Thus, the fluid-receiving cavities of the sealing gaskets 15 are areas of low turbulence. Some fluid will also be forced up and into the gasket 15' which acts to advance the grip annulus 16' along the inner cam surface of the coupling throat portion 14a and thereby hold the pipe 17 in position in much the same manner as was explained with regard to the gaskets 15 and grip annuluses 16.

It will be noted from the construction shown and described herein that there are no sharp edges exposed and the coupling housing body 12 and coupling nose members 10 and 11 are of a smooth construction with venturi type openings and with no sharp cutouts or abrupt edges adjacent ports, passageways and chambers through which active fluid flow takes place. See also the beveled ends 17a of the pipe 17. The configuration given to the flow shaping chamber B has the advantage of shaping the fluid flow and directing it out the pipe 17 with a minimum of turbulence and a minimum of friction loss. The flow through the port or passageway between inner ends of the members 10 and 11 initially represented by $e$ of Position 1 (see Figure 1) and then, by $f$ of Position 2, is a velocity flow by reason of the reduced area between opposed end walls 9a and 11a and with respect to the chamber defined by the members 10 and 11. There is a slight expansion in chamber B that is sufficient to aid in shaping the flow and smoothing out side-chamber turbulence. I have found that the construction shown and illustrated reduces frictional and other losses (measured in terms of equivalent diameters) to the extent that the range which the fluid will be dispersed by a spray head is increased by as much as five feet over a comparable coupling arrangement which utilizes a simple cutout opening with rough edges in a perfectly cylindrical housing body.

When fluid pressure is reelased, the grip annuluses 16, being inherently flexible, will tend to ride inwardly and backwardly along the tapered cam surfaces 13c and force the gasket 15 toward their initial positions against the gasket retaining shoulders 12c and 14d. In order to free the coupling nose members to remove them from the coupling housing body 12, it is first necessary to push the coupling member 10 or 11 inwardly, thus causing the land $b$ or $b'$ to move to a position beneath the grip annulus and to provide a forward abutment of the grip annulus against the shoulder face $a$ or $a'$, as is indicated by the solid lines of Figure 1 (Position 1). It will be noted that this pushed-in position corresponds to the initial position of the coupling members after they are assembled. The coupling member 10 or 11 may then be withdrawn by simply pulling it outwardly. The forward or end wall portions 10a and 11a pass out unimpeded by the grip annuluses which as preshaped or formed and, as pointed out previously, have internal diameters larger than the external diameter of the wall portions 10a and 11a.

Figure 1A illustrates the use of a coupling nose member 11' which has the same construction as the dead-end coupling member 11 of Figure 1 except that the closing wall 11e is omitted. All of the other elements of the coupling member are given numerals which correspond to the numerals of corresponding parts in the coupling member 11 except that primes have been added. Such a coupling nose member will, of course, be used as a through-flow member instead of a dead-end member and will be used only where a rigid joint can be made, that is, where a degree of flexibility or adjustability is not required in the joint, itself. When flexibility of the joint is required, then a coupling nose member 10 of the construction shown to the right of Figure 1 is employed; when flexibility of the joints at both longitudinal ends of the coupling is not desired, then a pair of coupling nose members of the type of 11' of Figure 1A will be used.

It will be noted that the pipe member 9' is affixed to the member 11' by forcing it into the internal diameter of the back wall portion 11'b and by rolling a pair of locking groove portions 11'e from the internal periphery of the wall 9'b of the pipe or conduit member 9'.

A close joint also reduces the possibility of leakage due to improper setting of the sealing lips of the gaskets when they are under low pressure. Leakage losses not only reduce fluid pressure, but cause undesirable puddling at the joint which is particularly detrimental where a seeded bed is being watered.

Where the crop row layout is such that only one joint need have a degree of flexibility, the coupling nose member 11' may be used in one end of the coupling housing body 12 and the coupling nose member 10 may be used in the opposite end of the coupling housing body 12. Af course, when a dead-end coupling member is to be used, a rigid joint is desirable and as a consequence, a dead-end coupling member such as the nose member 11 of Figure 1 is used.

As shown in Figure 1, the riser pipe or conduit member 17 has an annular positioning flange 18 to rest on upper lip edges of the throat wall portion 14a. This flange 18 not only limits the maximum amount of insertion of the member 17, but also supports its weight and the weight of other parts such as a spray head. After fluid pressure is off, the pipe may be removed by turning it and pulling it axially-outwardly.

I have found that friction loss and particularly, the loss due to square or wire-drawing edges can have a very great effect on the ultimate effective fluid flow head of the system. This is highly important from the standpoint of the conversion of pressure head to velocity head such as occurs in the region or the area of the chamber B and which is employed to provide a suitable spray head from the nipple 14 and through a riser pipe or member 17. Depending on flow velocity, I have found that square edge orifices may produce a spray loss of, for example, a 15 or 20 foot head. Thus, the friction at entry and efflux points of the coupling are highly important. This is the reason why the leading end or edge of the portion 9a of the member 9, of the portion 10a of the member 10, of the portion 11a of the member 11 (or 11'a of the member 11' of Figure 1A), and of the portions 14d and 17a of the part 14 and member 17 have rounded edges with a more gradual slope on the side against which fluid flow is directed from the pipe or conduit system. This is also one of the reasons why, as shown in Figure 2, there is provided a relatively smooth and gradual, approaching slope along the portion 12b that connects the nipple part 14 with the wall portion 12a of the flow-shaping chamber B. The importance of my form of flow modulation with minimized losses cannot be over-emphasized and especially so as to the opposed edges of the members 10 and 11 which define a venturi opening or passageway for the fluid or liquid to the chamber B (see flow lines $f_1$, $f_2$ and $f_3$ of Figure 1 of the drawings).

It will be apparent from the foregoing description and the accompanying drawings that I have accomplished the objects of my invention by providing a coupling construction which assures a positive holding action between parts, substantially reduces friction and leakage losses by shaping fluid flow in the members and by eliminating rough and sharp edges, provides for a maximum of interchangeability of various types of coupling nose members, and which will work even when sludge, dirt or other foreign matter is present in the fluid handled.

What I claim is:

1. An improved coupling construction for use with a fluid flow distribution system employing an angularly tiltable member which comprises, an integral coupling housing body of generally tubular construction, said housing body having substantially longitudinally-aligned open-end substantially identical sleeve portions in an opposite and connected relationship with each other, said sleeve portions each having an inner throat provided with a radially-inwardly-sloped grip surface, the throats of both said sleeve portions being of substantially the same construction and shape and having substantially the same inner diameters along corresponding portions of their respective lengths, the throats of said sleeve portions each having a quick-release flexible grip annulus and a fluid-pressure-sensitive annular gasket in a cooperative relation with each other and operatively carried thereby; a pair of coupling nose member, one of which is to be connected to a source of fluid, and the other of which has a closing end wall; each of said nose members having a cylindrical back portion connected integrally by a transition portion to a cylindrical inner end portion, said inner and outer cylindrical portions of said one nose member having substantially the same outer diameter and defining a wide clearance spacing with respect to a sleeve portion of said housing body within which it is inserted for providing a tiltable relationship with respect to said sleeve portion, the outer cylindrical portion of said other nose member having a larger outer diameter than the corresponding portion of said one nose member and defining a close clearance fit with an outer end portion of the throat of the other sleeve portion of said housing body within which said other nose member is inserted, the outer cylindrical portion of said other nose member having grip means thereon for inserting and withdrawing said other nose member with respect to an associated sleeve portion of said housing body, the closing end wall extending from the transition portion of said other nose member, the inner cylindrical portion of said other nose member having an outer diameter that is substantially smaller than the outer diameter of its said outer cylindrical portion and that substantially corresponds to the outer diameter of the cylindrical inner and outer portions of said one nose member, the transition portions of said nose members being substanitally identical and each having an outer release portion and an inner locking portion of smaller diameter, and the grip annuluses carried by the throats of said housing body being adapted to grip-engage between the sloped grip surfaces of the throats and the inner locking transition portions of said nose members to releasably hold said nose members within said housing body.

2. An improved coupling construction as defined in claim 1 wherein, said housing body has a coupling socket projecting upwardly at substantially right angles to and intermediate said sleeve portions, said coupling socket is open to fluid-flow from said housing body, and a spray head take-off pipe member is rotatably and guidably carried within said coupling socket to project therefrom.

References Cited in the file of this patent

UNITED STATES PATENTS

| | | |
|---|---|---|
| 658,313 | Bernardi | Sept. 18, 1900 |
| 1,860,346 | Anderson | May 31, 1932 |
| 1,861,314 | McAndrew | May 31, 1932 |
| 1,933,117 | Markle | Oct. 31, 1933 |
| 2,087,916 | Lanninger | July 27, 1937 |
| 2,184,376 | Beyer | Dec. 26, 1939 |

(Other references on following page)

UNITED STATES PATENTS

| | | |
|---|---|---|
| 2,449,735 | Wyss | Sept. 21, 1948 |
| 2,508,716 | Hauf | May 23, 1950 |
| 2,534,723 | Meese | Dec. 19, 1950 |
| 2,587,810 | Beyer | Mar. 4, 1952 |
| 2,687,905 | Jacobs | Aug. 31, 1954 |
| 2,693,378 | Beyer | Nov. 2, 1954 |
| 2,709,092 | Wallace | May 24, 1955 |
| 2,818,082 | Rickard | Dec. 31, 1957 |

FOREIGN PATENTS

| | | |
|---|---|---|
| 294,636 | Italy | Mar. 31, 1932 |
| 775,689 | France | Oct. 15, 1934 |